US009684292B1

(12) United States Patent
Wiens et al.

(10) Patent No.: US 9,684,292 B1
(45) Date of Patent: Jun. 20, 2017

(54) CONDITIONAL SWITCH RATE LOW PASS FILTER

(71) Applicant: Textron Innovations, Inc., Providence, RI (US)

(72) Inventors: ElRoy Henry Wiens, Newton, KS (US); Robin L. Young, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 496 days.

(21) Appl. No.: 14/478,970

(22) Filed: Sep. 5, 2014

(51) Int. Cl.
*G05B 13/02* (2006.01)
*G05B 15/02* (2006.01)

(52) U.S. Cl.
CPC .................................. *G05B 15/02* (2013.01)

(58) Field of Classification Search
None
See application file for complete search history.

(56) References Cited

U.S. PATENT DOCUMENTS

| | | | |
|---|---|---|---|
| 5,521,851 A | 5/1996 | Wei et al. | |
| 6,496,581 B1 * | 12/2002 | Finn | H04M 9/082 379/406.01 |
| 7,035,361 B2 | 4/2006 | Kim et al. | |
| 7,133,478 B2 * | 11/2006 | Vierthaler | H04B 1/1027 375/285 |
| 7,206,798 B1 | 4/2007 | Davis | |
| 7,636,747 B2 * | 12/2009 | Watanabe | H03H 17/0294 708/320 |
| 8,437,986 B2 | 5/2013 | Ko | |
| 2008/0089454 A1 | 4/2008 | Higuchi | |
| 2012/0207315 A1 * | 8/2012 | Kimura | G10L 21/034 381/66 |
| 2013/0308785 A1 * | 11/2013 | Christoph | G10K 11/175 381/71.1 |
| 2015/0068390 A1 * | 3/2015 | Zambon | G10H 5/007 84/658 |
| 2015/0222276 A1 * | 8/2015 | Milijevic | H03L 7/087 327/147 |
| 2015/0319528 A1 * | 11/2015 | Gao | H04R 3/005 381/71.7 |

* cited by examiner

*Primary Examiner* — Philip Wang
(74) *Attorney, Agent, or Firm* — Erise IP, P.A.

(57) ABSTRACT

A conditional switched rate filter system having a two stage digital filter to remove noise from the input signal. The first stage of the filter effectively removes the random noise from the input signal higher in frequency (cut-off frequency) than outside the characteristic response of the closed loop system. The second stage of the filter is used to filter out noise that is at same frequency response as the closed loop system.

12 Claims, 2 Drawing Sheets

—— Conditional switched rate filter
------ 2nd Order filter

CONDITIONAL SWITCH RATE LOW PASS FILTER

FIELD OF THE INVENTION

The disclosed invention relates to the field of filtering noise out of control systems.

DESCRIPTION OF THE RELATED ART

It is a problem to filter environmental noise out of a control system using an input sensor that produces a significant amount of noise in the same frequency band in which a closed loop control system is designed to operate. Using classical filter design, the cutoff frequency required to clean up the input sensor noise may be significantly lower than the control system cutoff frequency.

In present practice, cutoff frequency is selected or specified and a filter is designed using classical techniques with many available algorithms to select from. Key to this approach is that the frequency selected is chosen to best address the majority of cases the application requires. If it is discovered through experience that the selected cutoff frequency does not address the environment as expected, the usual solution is to change the cutoff frequency, or increasing or decreasing the filter order to improve the match of the filter to the environment.

A closed-loop software control system relies on input from a sensor to determine a command to the output drive. The signals received from some sensors contain a significant amount of noise added to the signal used to operate the system. When the noise falls into the same frequency range as the normal system response, it is very difficult to differentiate noise from the system input. In this instance, a filter strong enough to separate the noise from normal system activity would produce an unacceptable delay in the response time of the system, resulting in poor system performance. The other choice is a fast filter which causes erratic behavior of the system.

Other methods of filtering noise include the use of multi-pole and running average filters. Multi-pole filters can be implemented by passing the signal through the same filter repeatedly. These high order filters result in a clean signal at the cost of response time. For real-time systems, it is not practical to delay the system output by the amount of time it takes to execute this type of filter. Likewise, a running average filter that would adequately remove noise from the incoming signal would also unsatisfactorily delay the system output response.

SUMMARY OF THE INVENTION

In one embodiment, a conditional switched rate low pass filter for reducing noise in a closed-loop control system is disclosed. The system includes a first low pass digital filter, the input of which is coupled to an output of the control system. The first digital filter removes noise, from the output signal of the control system, which is higher in frequency than the characteristic response of the control system.

The system also includes a second low pass digital filter, the input of which is coupled to the output of the first digital filter, and the output of which is coupled back into the control system. The second digital filter removes noise which is essentially at the same frequency as the closed-loop system response.

A buffer memory stores the output signal from the first digital filter, and a signal stability monitor module, coupled to the buffer memory, is configured to detect changes in the output signal from the first digital filter. A computer implements the first digital filter, the second digital filter, and the signal stability monitor module, and is coupled to the buffer memory, for controlling the operation of the switched rate low pass filter. The signal stability monitor determines the response time of the second digital filter based on monitoring of the output signal from the first digital filter, as stored in the buffer memory.

If the output signal has changed by more than a predetermined value, the cutoff frequency of the second digital filter is increased to a predetermined value within a predetermined time period; and if the output signal maxima and minima have been stable within a predetermined range for at least a predetermined period of time, the cutoff frequency of the second filter stage is decreased to its original value.

DETAILED DESCRIPTION

The presently-described system and method comprises identification of different phases of a control system. A phase is identified wherein the system spends a significant amount of time in a static or near-static state. During this phase, the present conditional switched rate filter enters a slow response mode, yielding a stable output to the system. Another phase of the system exists when the input sensor signal is rapidly changing. During this phase, the filter switches to a fast response mode, allowing the output to properly control the system without significant lag. The system then looks for an indication that the system input is stable before switching back to the slow response mode.

Another significant feature of the present filter is conditionally switching between phases to allow the output to be stable when the system is idle and responsive when the system is active. The present conditional switched rate filter, along with the conditions for switching modes, produces a unique solution.

Advantages of the conditional switched rate filter over the prior art include more closely following the average value of the input, significantly reducing jitter and then a rapid transition to closely tracking the input when it is required. The advantages of conditional switched rate filtering extend to other filter systems as well. A high pass filter can be switched to a longer time constant in the instance where a longer dwell time is required for certain input conditions than for others. As long as the system transition conditions and the related cutoff frequencies can be identified the present conditional switched rate filter provides an improved solution over the prior art.

Figure 1:
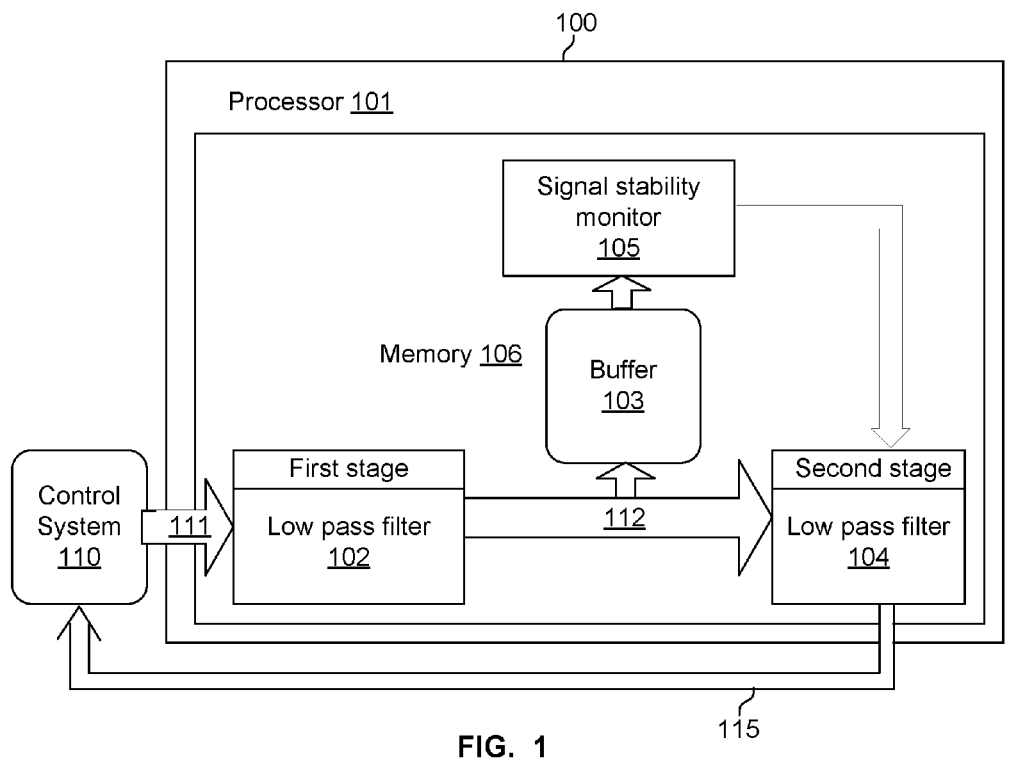
FIG. 1 is a diagram of an exemplary conditional switched rate low pass filter.

FIG. 1 is a diagram of an exemplary conditional switched rate low pass filter 100. As shown in FIG. 1, filter 100 comprises a two-stage filter with a first stage including a low pass digital filter 102, and a second stage including a digital low pass filter 104. A first-in first-out (FIFO) buffer 103, placed between filter stages 102 and 104, receives the signal output 112 from the first stage 102 and, in an exemplary embodiment, buffers at least a half of a second of the signal such that the signal stability can be determined by a signal stability monitor software module 105. Each of the functions performed by elements 102, 103, 104, and 105 is performed by a corresponding software application ('module'), stored in memory 106, and executing on processor 101.

Processor 101 controls operating parameters of first and second stage filters 102/104 via software which executes algorithms (described with respect to FIG. 3, below) for filters 102/104 and signal stability monitor 105. In operation, the input of filter 100 is connected to an output 111 of a closed-loop control system 110, and the output of the filter is fed back into the control system input.

The present filter 100 employs a two stage digital filter to remove noise from the control system input signal 111. The first stage 102 of the filter effectively removes the random noise from the input signal higher in frequency than the characteristic response of the closed loop control system. In an exemplary embodiment, in its fast response mode, the second filter stage 104 doubles the function of the first stage 102 forming a second order filter to remove random noise higher in frequency than the response of the closed loop system 110/111/115.

As an example, in fast response mode, second stage filter 104 has a cutoff frequency of 1.2 Hz. In this example, in slow response mode, the second stage 104 employs a cutoff frequency of 0.13 Hz, which is within the response of the closed loop system 110, which is designed to respond to signals with frequencies between 0.3 and 0.2 Hz.

Filter 100 switches its response time by monitoring the output 112 of the first filter/stage 102. As indicated in FIG. 1, arrow 112 represents the output 112 of the first filter/stage 102, which is hereinafter referred to as the 'input signal' 112 to the second filter stage 104. In an exemplary embodiment, low pass filter stage 102 is always active with a constant cutoff frequency. To transition from slow to fast response mode, a filter algorithm 300 (described below with respect to FIG. 3) looks for large changes in input signal within a predetermined time period. The input signal 112 from the first filter stage 102 is recorded continuously using a first-in first-out (FIFO) buffer 103. If the input signal 112 varies by more than a predetermined amount within a specific time period, the second filter stage 104 is switched to its fast response mode. In this mode, the signal stability monitor 105 then begins to measure the input signal 112 for stability.

Stability is achieved when the input signal 112 has been within a predetermined (small) range for a predetermined period of time. The allowable signal range is determined by detecting maxima and minima from the input signal 112. Once the maxima and minima have been within the allowable range for the predetermined period of time, filter stage 104 switches to its slow response mode.

The filter algorithm 300 is flexible in that the criteria for switching from slow to fast response mode can be different than the criteria for switching from fast to slow response mode. Likewise, the range of input values used to measure rapid change of input signal 112 can be different than the range used to detect stability. This allows for greater stability when changing between filter modes. In the current example, the input signal must be stable within 0.16°/second for 0.75 second in order to switch from fast to slow response mode. If the input has varied by more than 0.14°/second within the last 0.5 second, filter stage 104 will switch from slow to fast response mode.

Figure 2:
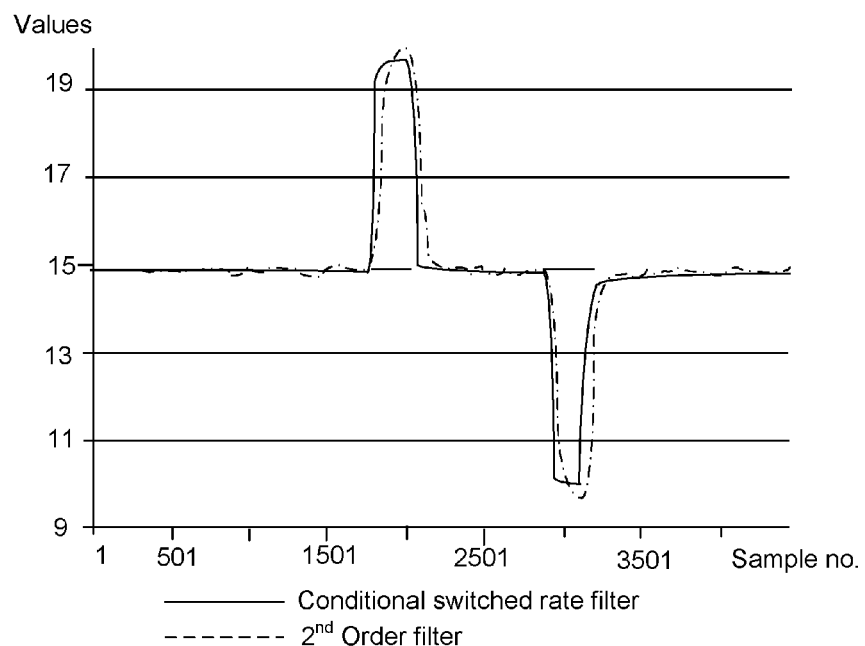
FIG. 2 is a step response graph of an exemplary conditional switched rate low pass filter.

FIG. 2 is a step response graph of an exemplary conditional switched rate low pass filter 100 showing an example of a situation wherein a fast response is required when the input signal changes rapidly, coupled with a slower, smooth response when the nominal input is stable.

As shown in FIG. 2, the second order filter response (represented by a dashed line) represents current practice where a compromise solution has been reached. A significant amount of output fluctuation is present even though the input average is relatively stable; however, the output is significantly delayed from the input during rapid changes in the input signal. This results in unwanted jitter and fluctuation in the output, along with induced output lag, when compared to a rapidly moving input.

The response of the present conditional switched rate low pass filter 100 is indicated by the solid line in FIG. 2, where it can be seen that, compared to a prior art second order filter (indicated by the dashed line), the switched rate filter 100 more closely follows the average value of the input, significantly reducing jitter, and also more rapidly transitions to close tracking of the input when required.

Figure 3:
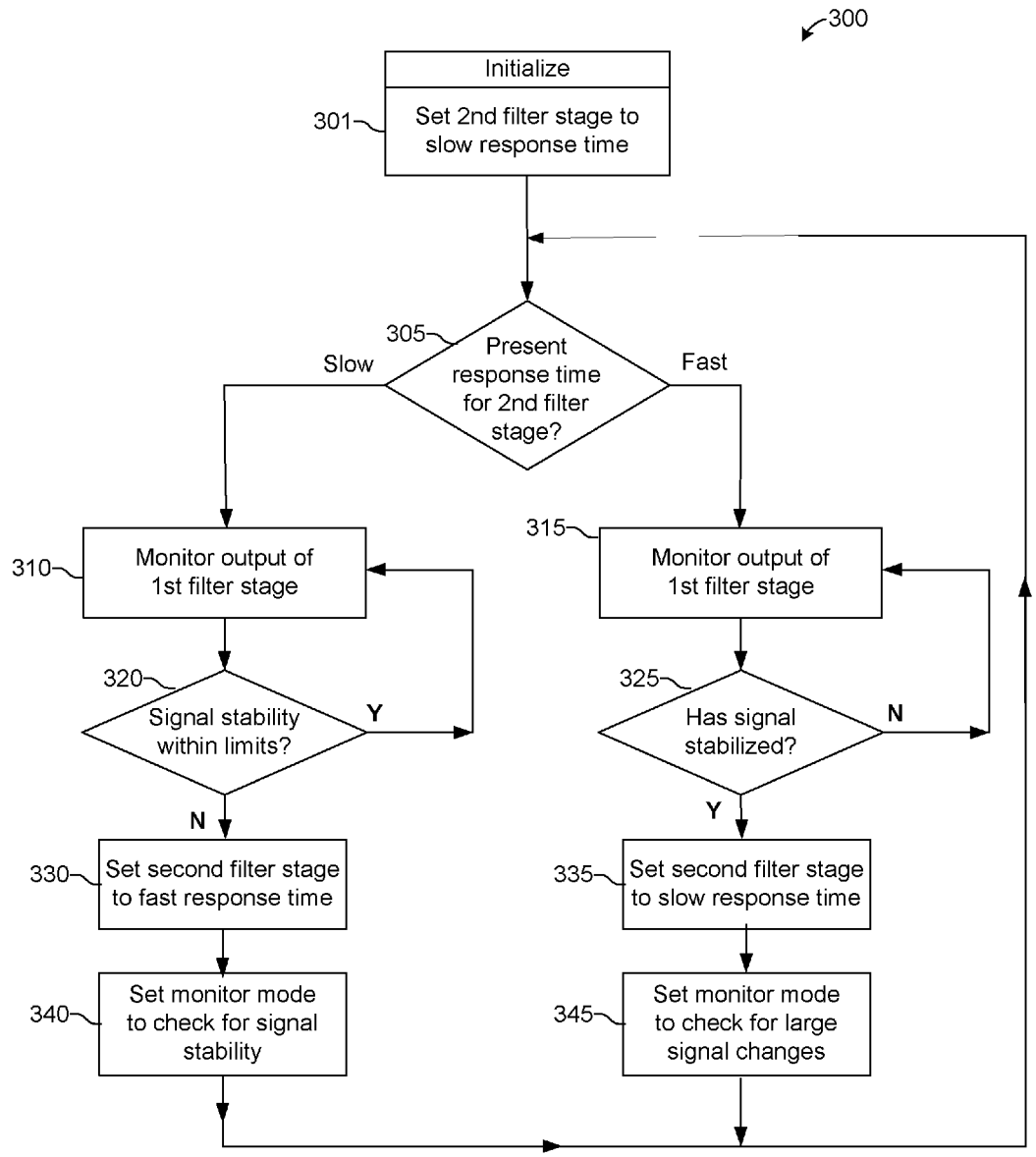
FIG. 3 is a flowchart showing an exemplary set of steps performed by the present conditional switched rate low pass filter algorithm.

FIG. 3 is a flowchart showing an exemplary set of steps performed by the present conditional switched rate low pass filter algorithm 300, which is executed on processor 101. As shown in FIG. 3, at step 301, the second filter stage 104 of the conditional switched rate filter 100 is initialized to a slow response time mode. For example, in a closed loop system with a characteristic response frequency of 0.2 Hz, second filter stage 104 is set to a cutoff frequency of 0.126 Hz.

At step 305, a check is made to determine whether the second filter stage 104 of the conditional switched rate filter 100 is presently set to slow or fast response time mode. If a fast response time mode is set, system operation continues at step 315, described further below, otherwise system operation continues at step 310, with filter 104 set to slow response time mode.

At step 310, signal stability monitor 105 monitors the output of first stage filter 102 for changes in maxima and minima of signal 112 via inspection of buffer 103. In the present example, if signal stability monitor 105 detects that the output of filter 102 has changed by more than a predetermined value within a predetermined time period (e.g., 0.14°/second within 0.5 second), the cutoff frequency of the second filter stage 104 is increased to a predetermined value, e.g., to 1.2 Hz (step 330), improving its response time to the input signal 112. The response time of the second filter stage may be increased by some predetermined or in-process calculated value. It is possible to gradually change the response time of the filter in smaller steps (by reducing the cutoff frequency by 0.2 HZ every 0.25 seconds, for example), or adjusting the step size based on the amount of change in the input signal. For example, if the input changed by 0.12°/second within 0.5 seconds the second stage filter 104 could change its response time to (3×0.12)Hz.

At step 340, signal stability monitor 105 is configured to look for signal stability in input signal 112. System operation then continues at step 305.

At step 315, buffer 103 captures changes in maxima and minima of signal 112. While step 315 could be identical to 310, it is more memory-efficient to keep track of just the high and low points of the incoming data. If a new incoming data point is higher than the last recorded maximum point, the old maximum point is replaced by the new one. Likewise, if a new incoming data point is lower than the last recorded minimum point, the old minimum point is replaced by the new one. After a set period of time has elapsed without updating either point, the signal can be declared stable. In this method, the difference (D) between the maximum and minimum points must be fixed. When the maximum point is stored, the minimum point is updated to be Maximum−D. When the minimum point is stored, the maximum point is updated to be Minimum+D. This allows oscillations of an amplitude below D to be declared stable, and oscillations with an amplitude above D to continue to be tracked.

If signal stability monitor 105 determines, at step 325, that the maxima and minima have been stable within a predetermined range (for example, within 0.16°/second) for more than a predetermined period of time (e.g., 0.75 second), then the cutoff frequency of the second filter stage 104 is reset (i.e., is decreased) to its original value, in the present example, 0.126 Hz (step 335).

In an alternative embodiment, as in the previous case, the filter cutoff frequency could be decreased in small steps, or could drop down to a set point based on the amplitude of the oscillations on the incoming signal 112.

At step 345, signal stability monitor 105 is configured to look for large changes (for example, 0.14°/second) in the input signal 112, and the cycle repeats at step 305.

The invention claimed is:

1. A conditional switched rate low pass filter for reducing noise in a closed-loop control system comprising:
   a first low pass digital filter, the input of which is coupled to an output of the control system, wherein the first digital filter removes noise, in the signal from the output of the control system, higher in frequency than the characteristic response of the control system;
   a second low pass digital filter, the input of which is coupled to the output of the first digital filter, and the output of which is coupled back into the control system; wherein the second digital filter removes noise which is at essentially the same frequency as the closed-loop system response;
   buffer memory for storing an output signal from the first digital filter;
   a signal stability monitor module, coupled to the buffer memory, configured to detect changes in the output signal from the first digital filter; and
   a computer implementing the first digital filter, the second digital filter, and the signal stability monitor module, coupled to the buffer memory, for controlling the operation of the switched rate low pass filter;
   wherein the signal stability monitor determines the response time of the second digital filter based on monitoring of the output signal from the first digital filter, as stored in the buffer memory, and wherein:
      if the output signal has changed by more than a predetermined value within a predetermined time period, the cutoff frequency of the second digital filter is increased to a predetermined value; and
      if the output signal maxima and minima have been stable within a predetermined range for at least a predetermined period of time, the cutoff frequency of the second digital filter is decreased to a predetermined value.

2. The system of claim 1, wherein the cutoff frequency of the second filter is changed in one step.

3. The system of claim 1, wherein the cutoff frequency of the second filter is changed gradually over a period of time.

4. The system of claim 1, wherein criteria for increasing the frequency response of the second filter are different than criteria for decreasing the frequency response thereof.

5. The system of claim 1, wherein:
   the second low pass digital filter can be set to either a fast response time mode or to a slow response time mode, and is initially set to the slow response time mode; and
   if the second low pass digital filter is set to the slow response time mode, then
      if the output signal from the first digital filter has changed by more than the predetermined value within the predetermined time period, the cutoff frequency of the second digital filter is increased to the predetermined value, and the signal stability monitor is configured to check for stability of the output signal;
   if the second low pass digital filter is set to the fast response time mode, then
      if the output signal maxima and minima have been within the predetermined range for at least a predetermined period of time the, cutoff frequency of the second digital filter is decreased to the predetermined value, and the signal stability monitor is configured to check for large changes in the output signal.

6. The system of claim 5, wherein the cutoff frequency of the second filter is changed in one step.

7. The system of claim 5, wherein the cutoff frequency of the second filter is changed gradually over a period of time.

8. A method for conditionally switching the cutoff frequency of a digital filter to reduce noise in a closed-loop control system comprising:
   filtering an output of the control system via a first low pass digital filter stage;
   receiving the output signal from the first low pass filter stage via a second low pass digital filter stage;
   monitoring the output signal from the first low pass digital filter stage to determine the stability of the output signal; wherein:
      if the output signal has changed by more than a predetermined value within a predetermined time period, the cutoff frequency of the second low pass digital filter stage is increased to a predetermined value; and
      if the output signal maxima and minima have been stable within a predetermined range for a predetermined period of time, the cutoff frequency of the second low pass digital filter stage is decreased to a predetermined value.

9. The method of claim 8, wherein:
   the second low pass digital filter stage can be set to either a fast response time mode or to a slow response time mode, and is initially set to the slow response time mode; and
   if the second low pass digital filter stage is set to the slow response time mode, then
      if the output signal from the first digital filter stage has changed by more than the predetermined value within the predetermined time period, the cutoff frequency of the second digital filter stage is increased to the predetermined value, and the signal stability monitor is configured to check for stability of the output signal;
   if the second low pass digital filter stage is set to the fast response time mode, then
      if the output signal maxima and minima have been within the predetermined range for at least a predetermined period of time the, cutoff frequency of the second digital filter stage is decreased to the predetermined value, and the signal stability monitor is configured to check for large changes in the output signal.

10. The system of claim 8, wherein the cutoff frequency of the second filter stage is changed in one step.

11. The system of claim 8, wherein the cutoff frequency of the second filter stage is changed gradually over a period of time.

12. The system of claim 8, wherein criteria for increasing the frequency response of the second filter stage are different than criteria for decreasing the frequency response thereof.

* * * * *